United States Patent
Nanaumi

(10) Patent No.: US 7,805,418 B2
(45) Date of Patent: Sep. 28, 2010

(54) DATA-PROCESSING APPARATUS, DATA PROCESSING METHOD, AND STORAGE MEDIUM

(75) Inventor: Yoshihito Nanaumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 11/200,989

(22) Filed: Aug. 10, 2005

(65) Prior Publication Data

US 2006/0041592 A1 Feb. 23, 2006

(30) Foreign Application Priority Data

Aug. 20, 2004 (JP) .............................. 2004-241423

(51) Int. Cl.
*G06F 7/00* (2006.01)
*G06F 17/00* (2006.01)
(52) U.S. Cl. ....................... 707/695; 707/791; 707/793
(58) Field of Classification Search .................. None
See application file for complete search history.

(56) References Cited

U.S. PATENT DOCUMENTS

| | | | | |
|---|---|---|---|---|
| 5,675,802 A * | 10/1997 | Allen et al. | .................. | 717/103 |
| 6,560,620 B1 * | 5/2003 | Ching | ........................ | 715/229 |
| 6,832,351 B1 * | 12/2004 | Batres | ........................ | 715/234 |
| 6,992,786 B1 * | 1/2006 | Breding et al. | ............. | 358/1.15 |
| 7,035,842 B2 * | 4/2006 | Kauffman et al. | .............. | 707/3 |
| 7,120,868 B2 * | 10/2006 | Salesin et al. | ............... | 715/249 |
| 7,181,445 B2 * | 2/2007 | Bebo et al. | ..................... | 707/3 |
| 2001/0042064 A1 * | 11/2001 | Davis et al. | ..................... | 707/3 |
| 2002/0107859 A1 * | 8/2002 | Tsuyuki | ..................... | 707/100 |
| 2002/0129034 A1 * | 9/2002 | Woehl | ..................... | 707/103 R |
| 2002/0186241 A1 * | 12/2002 | Kohda et al. | ................ | 345/744 |
| 2003/0182450 A1 * | 9/2003 | Ong et al. | .................... | 709/246 |
| 2003/0200507 A1 * | 10/2003 | Stern et al. | .................. | 715/517 |
| 2003/0204637 A1 * | 10/2003 | Chong | .................... | 709/310 |
| 2003/0229446 A1 * | 12/2003 | Boscamp et al. | ............ | 701/213 |
| 2004/0162858 A1 * | 8/2004 | Messer | ....................... | 707/204 |
| 2005/0034054 A1 * | 2/2005 | Tsuyama et al. | ............ | 715/500 |

FOREIGN PATENT DOCUMENTS

JP 2002-163095 6/2002

* cited by examiner

*Primary Examiner*—Jay A Morrison
(74) *Attorney, Agent, or Firm*—Canon USA Inc IP Div.

(57) ABSTRACT

A data-processing apparatus for processing form data including predetermined layout information and image-forming data formed by merging variable data in the form data includes a history table for storing a corresponding relationship of each form data, between the image-forming data and the variable data used in the image-forming data; and a registering unit for registering the corresponding relationship in order to generate image-forming data.

13 Claims, 15 Drawing Sheets

FIG. 4
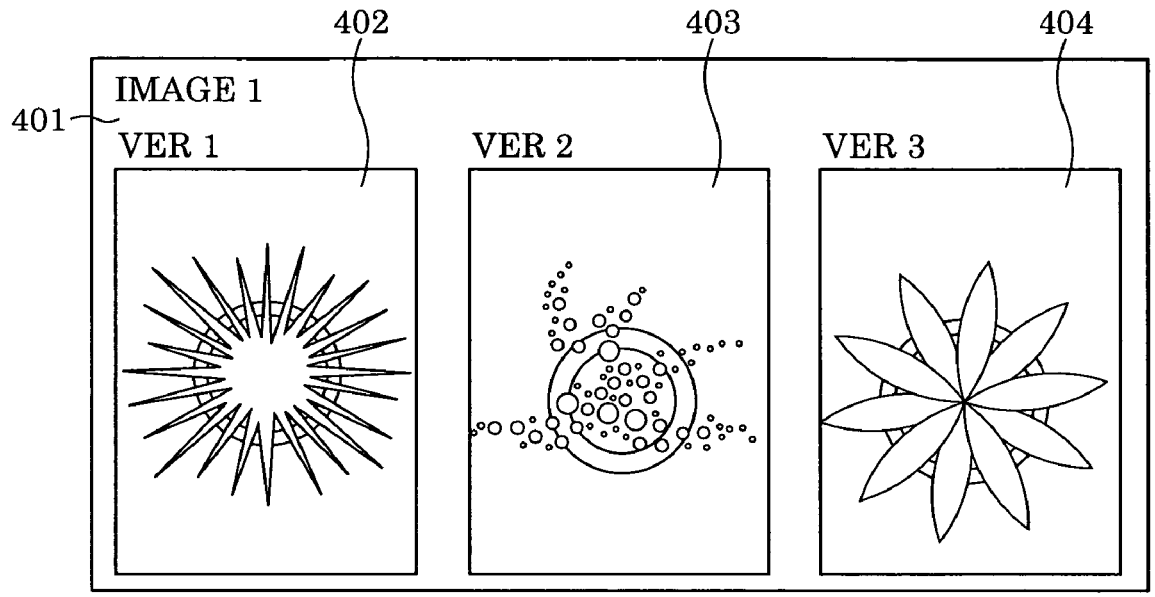
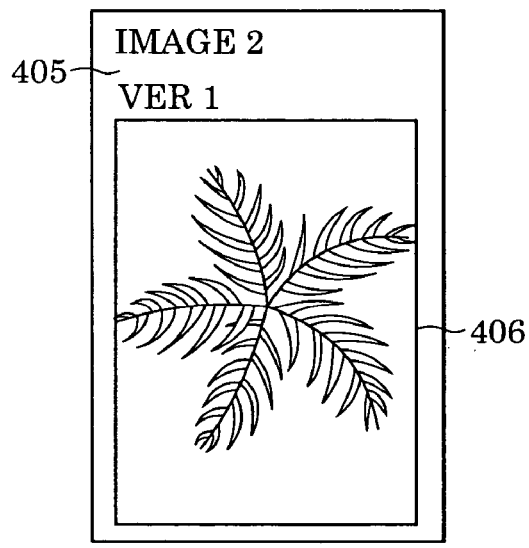
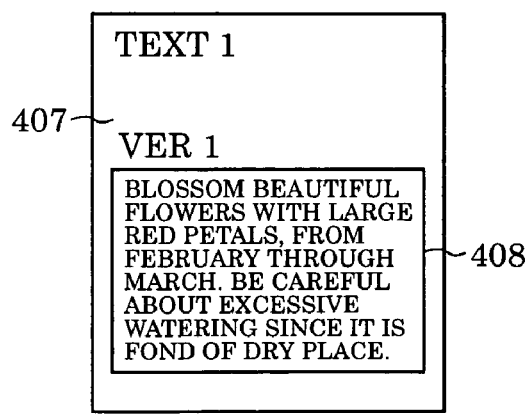

FIG. 9
901 — FORM A
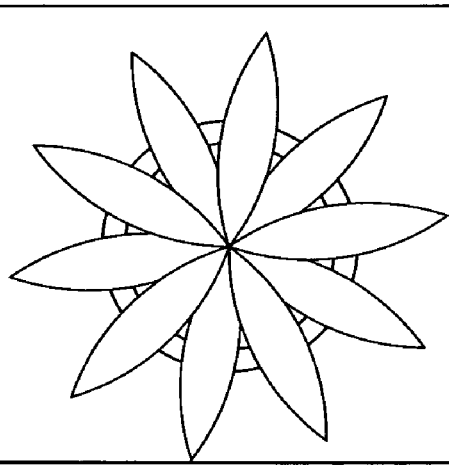
902 —
IMAGE 1   VER 3
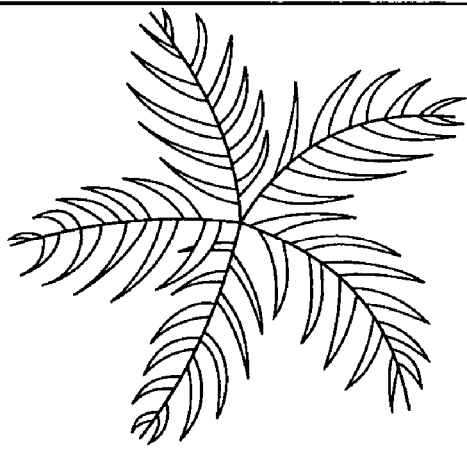
903 —
IMAGE 2   VER 1
904 — BLOSSOM BEAUTIFUL FLOWERS WITH LARGE RED PETALS, FROM FEBRUARY THROUGH MARCH. BE CAREFUL ABOUT EXCESSIVE WATERING SINCE IT IS FOND OF DRY PLACE.
TEXT 1   VER 1

FIG. 10

| HISTORY ID | USER NAME | FORM NAME | ORIGINAL DATA NAME |
|---|---|---|---|
| 1 | USER C | FORM B | IMAGE 1, IMAGE 2 |
| 2 | USER B | FORM C | IMAGE 1, TEXT 1 |
| 3 | USER A | FORM A | IMAGE 1, IMAGE 2, TEXT 1 |

FIG. 11

| ORIGINAL DATA NAME | VER | HISTORY ID |
|---|---|---|
| IMAGE 1 | 1 | 1 |
| | 2 | 2 |
| | 3 | 3 |
| IMAGE 2 | 1 | 1, 3 |
| TEXT 1 | 1 | 2, 3 |

| ORIGINAL DATA NAME | VER | HISTORY ID |
|---|---|---|
| IMAGE 1 | 1 | 1 |
| | 2 | 2 |
| | 3 | 3 |
| | 4 | 1, 3 |
| IMAGE 2 | 1 | 1, 3 |
| TEXT 1 | 1 | 2, 3 |

FIG. 15

| ORIGINAL DATA NAME | VER | HISTORY ID |
|---|---|---|
| IMAGE 1 | 1 | 1 |
|  | 2 | 2 |
|  | 3 |  |
|  | 4 | 3 |
| IMAGE 2 | 1 | 1, 3 |
| IMAGE 3 | 1 | 2, 3 |

FIG. 16

| ORIGINAL DATA NAME | VER | HISTORY ID |
|---|---|---|
| IMAGE 1 | 1 | 1 |
|  | 2 | 2 |
|  | 4 | 3 |
| IMAGE 2 | 1 | 1, 3 |
| IMAGE 3 | 1 | 2, 3 |

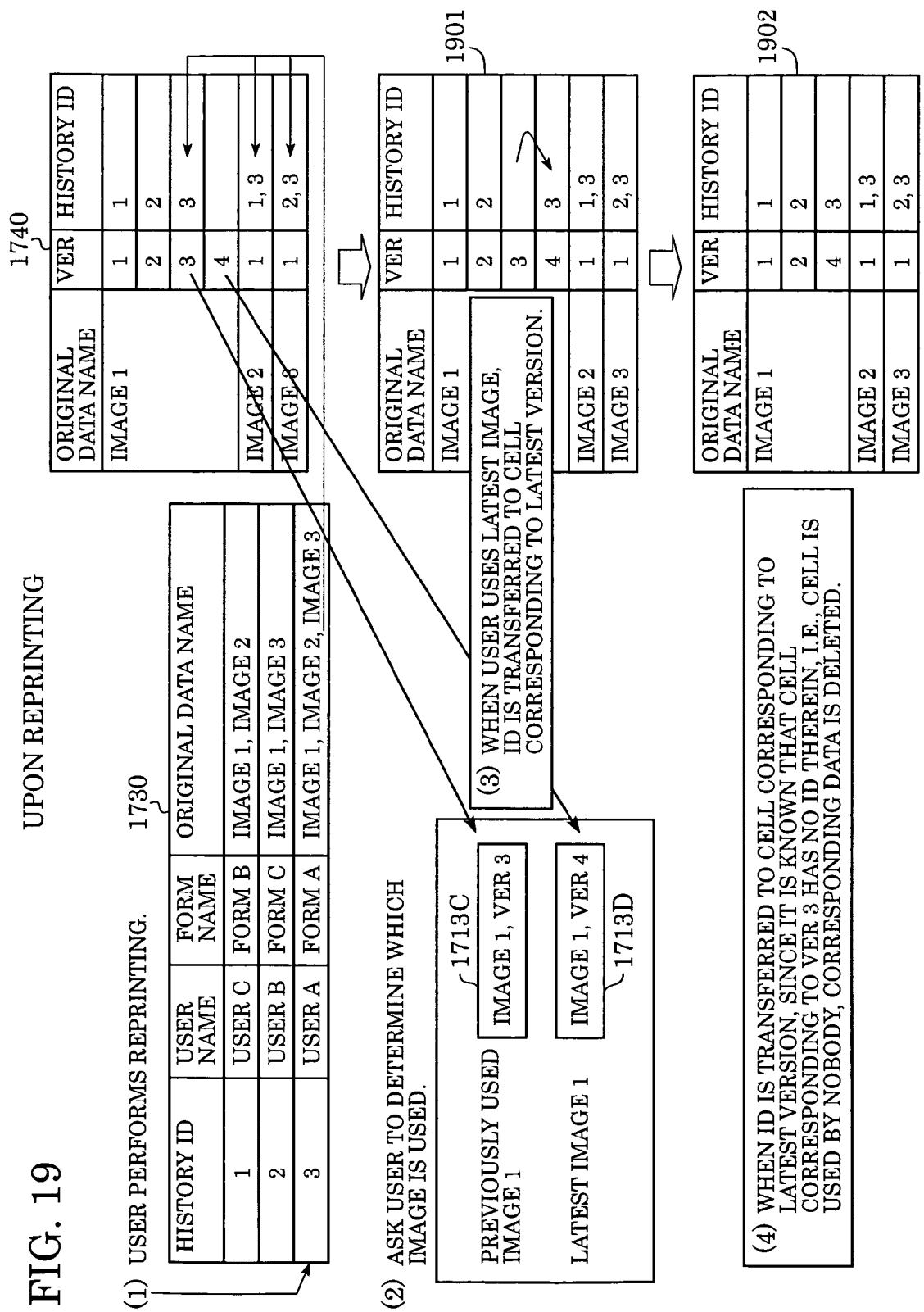

DATA-PROCESSING APPARATUS, DATA PROCESSING METHOD, AND STORAGE MEDIUM

BACKGROUND OF THE INVENTION

1. Field of the Invention

The present invention relates to data processing, and more particularly, it relates to processing of image-forming data including variable data.

2. Description of the Related Art

When a user requires common document-printing data, generating the document-printing data by a server on the basis of a common printing document-form and document data every time is ineffective. Japanese Patent Laid-Open No. 2002-163095 discloses a technique that, once generated document-printing data is saved in the server, it is transferred to a client in response to an additional instruction from a Web browser.

In order to produce an on-demand catalogue, reusing or reprinting a previously produced catalogue by a user is required. However, management of custom catalogues produced by every user causes difficulty in data management due to excessively large capacity of the data.

SUMMARY OF THE INVENTION

The present invention is directed to a data-processing apparatus, a data-processing method, and a program, with which, for example, when a user wants to reuse or reprint a previously produced catalogue upon producing an on-demand catalogue, simple and easy data management is achieved so as to prevent a capacity of catalogue data from becoming excessively large, which would become large without any management.

In one aspect of the present invention, a data-processing apparatus for processing form data including predetermined layout information and image-forming data formed by merging variable data in the form data includes a history table storing a corresponding relationship of each form data, between the image-forming data and the variable data used in the image-forming data; and a registering unit registering the corresponding relationship in order to generate image-forming data.

Other features of the present invention will be apparent from the following description of exemplary embodiments taken in conjunction with accompanying drawings, in which like reference characters designate the same or similar parts through thereof.

BRIEF DESCRIPTION OF THE DRAWINGS

FIG. 4 illustrates a method for saving image data and text data in a database, serving as the basis for generating catalogue data.

FIG. 9 illustrates an exemplary on-demand catalogue produced by the user.

FIG. 10 illustrates a history table to which a history is added by the user upon producing the on-demand catalogue.

FIG. 11 illustrates a management table for linking variable data and the history table to each other.

FIG. 15 illustrates a state in which, when an updated version is used by the user, a history ID in a variable data management table is transferred to a cell of the management table corresponding to the updated version.

FIG. 16 illustrates another variable-data management table having a history ID corresponding to Version 3 removed from its history ID column.

FIG. 19 illustrates a case where a catalogue is reprinted in a state of the history table and the management table shown in FIG. 18.

DESCRIPTION OF THE EMBODIMENTS

Apparatuses according to exemplary embodiments of the present invention will be described.

General Description of the Embodiments

Figures 5, 6:
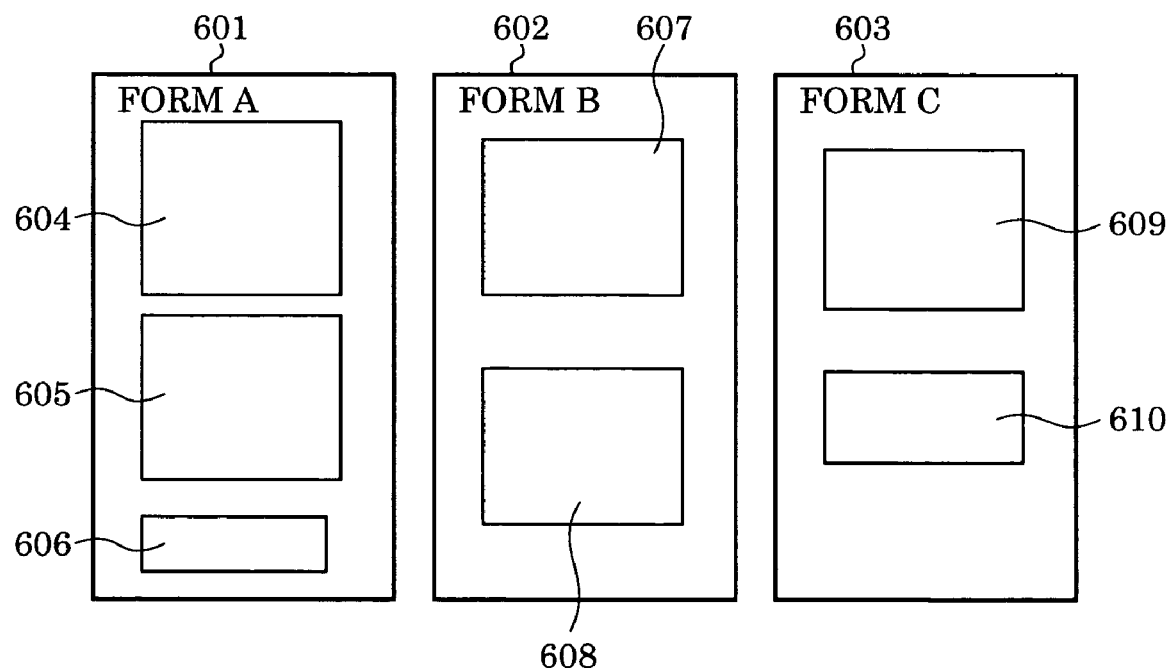
FIG. 5 illustrates a database table for managing variable data serving as the basis for producing an on-demand catalogue.
FIG. 6 illustrates form data saved in the database.
Figure 17:
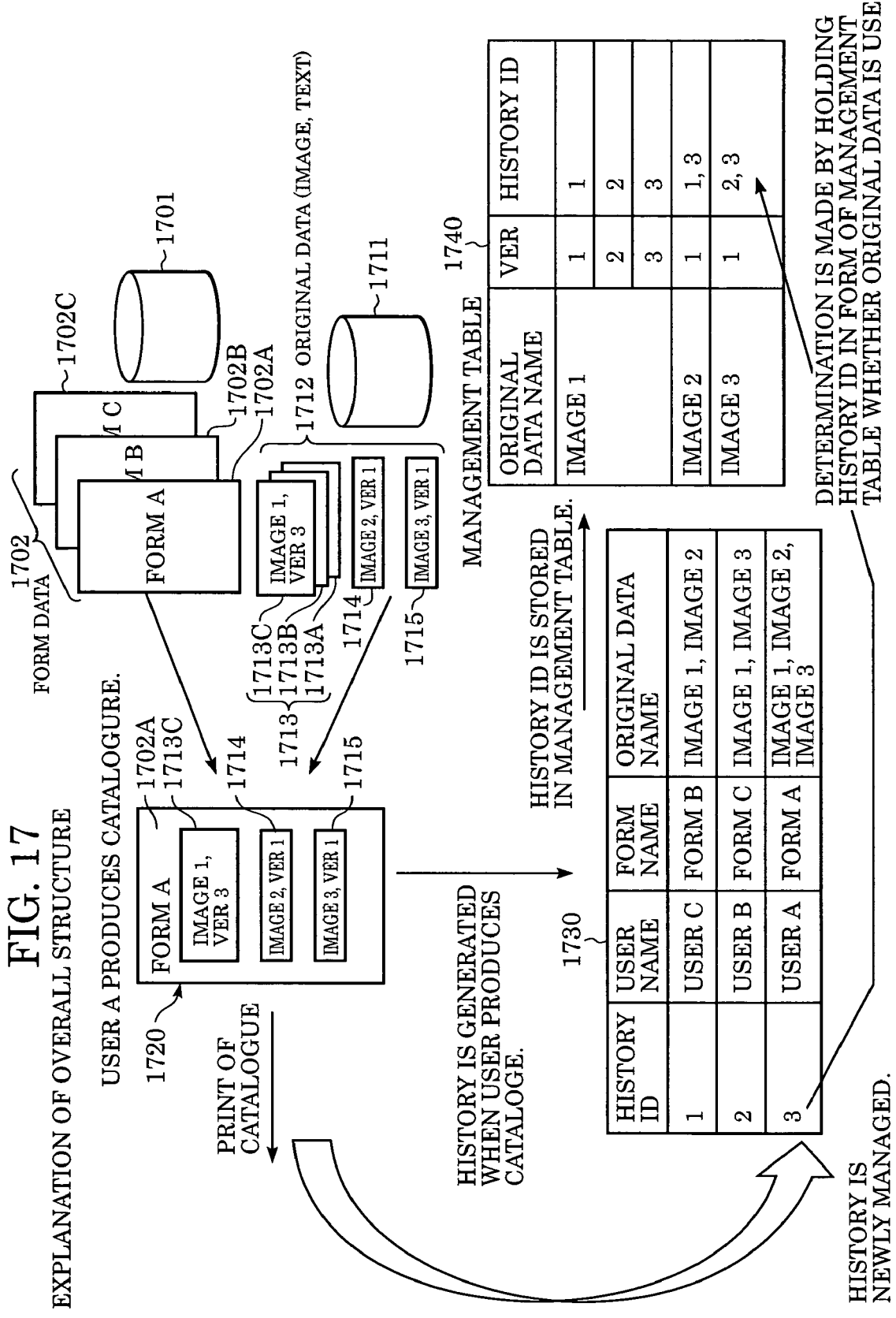
FIG. 17 illustrates an exemplary overall structure of the on-demand catalogue-producing system according to the embodiment of the present invention.

FIG. 17 illustrates an exemplary overall structure of an on-demand catalogue-producing system (a data-processing apparatus) according to embodiments of the present invention. A database 1701 has form data 1702 stored therein. The form data 1702 includes Form A (1702A), Form B (1702B), and Form C (1702C), each serving as a document form for generating catalogue data. FIG. 6 illustrates examples Form A (601), Form B (602), and Form C (603). Areas 604 to 610 are portions in which a user can merge image data, text data, or the like. The form data 1702 can be generated or changed by the user.

Another database 1711 has original data (variable data) 1712 stored therein. The original data 1712 includes Image 1 (1713), Image 2 (1714), and Image 3 (1715), each serving as image data, text data, or the like. Image 1 (1713) includes data 1713A in Version 1, data 1713B in Version 2, and data 1713C in Version 3. A user can upgrade Image 1 as described above. Data in each version is stored in the database in a form of a history. The image data 1714 is data of Image 2 in Version 1. The image data 1715 is data of Image 3 in Version 1.

A management table 1740 has original data information registered therein. Original data names of the original data correspond to respective file names and are registered as Image 1 (1713), Image 2(1714), and Image 3 (1715). Image 1 has Versions 1 to 3, Image 2 has Version 1, and Image 3 has Version 1.

By selecting one of the form data 1702 and the original data 1712 to be merged in the selected form data 1702, the user can produce a catalogue. For example, the user can produce a catalogue (hereinafter, sometimes referred to as configuration data or image-forming data) 1720 by selecting Form A (1702A), and then, by selecting the data 1713C of Image 1 in Version 3, the data 1714 of Image 2 in Version 1, and the data 1715 of Image 3 in Version 1 so as to be merged in Form A (1702A).

When User A produces the catalogue 1720, it is registered in a history table 1730 and the management table 1740. Its history ID, operator name, form name, and original data name are registered in the history table 1730. For example, when User A produces the catalogue 1720, its history ID is registered in a form of Number 3 in the history table 1730. Its operator name and form name are respectively User A and Form A (1702A). Its original data names are Image 1, Image 2, and Image 3. The history IDs are registered in the management table 1740 so as to correspond to the respective original data names. Number 3 is registered in the corresponding cells of the history ID column of the management table 1740, corresponding to Image 1 in latest Version 3, Image 2 in Version 1, and Image 3 in Version 1. By storing History IDs in the management table 1740, a determination can be made whether each original data is used. After producing the catalogue 1720, User A can print it.

Information about what and how form data (document form) and original data (Image, Text) are used by a user for producing a catalogue can be managed in a form of history in the history table 1730, and upon reusing the information, a new catalog is reproduced on the basis of the history. If any administrator updates original data on this occasion, a previously produced catalogue cannot be produced again. Hence, the management table 1740 linking a history ID (a unique number provided to the history generated by a user upon producing a catalogue) and the original data is prepared.

Figure 18:
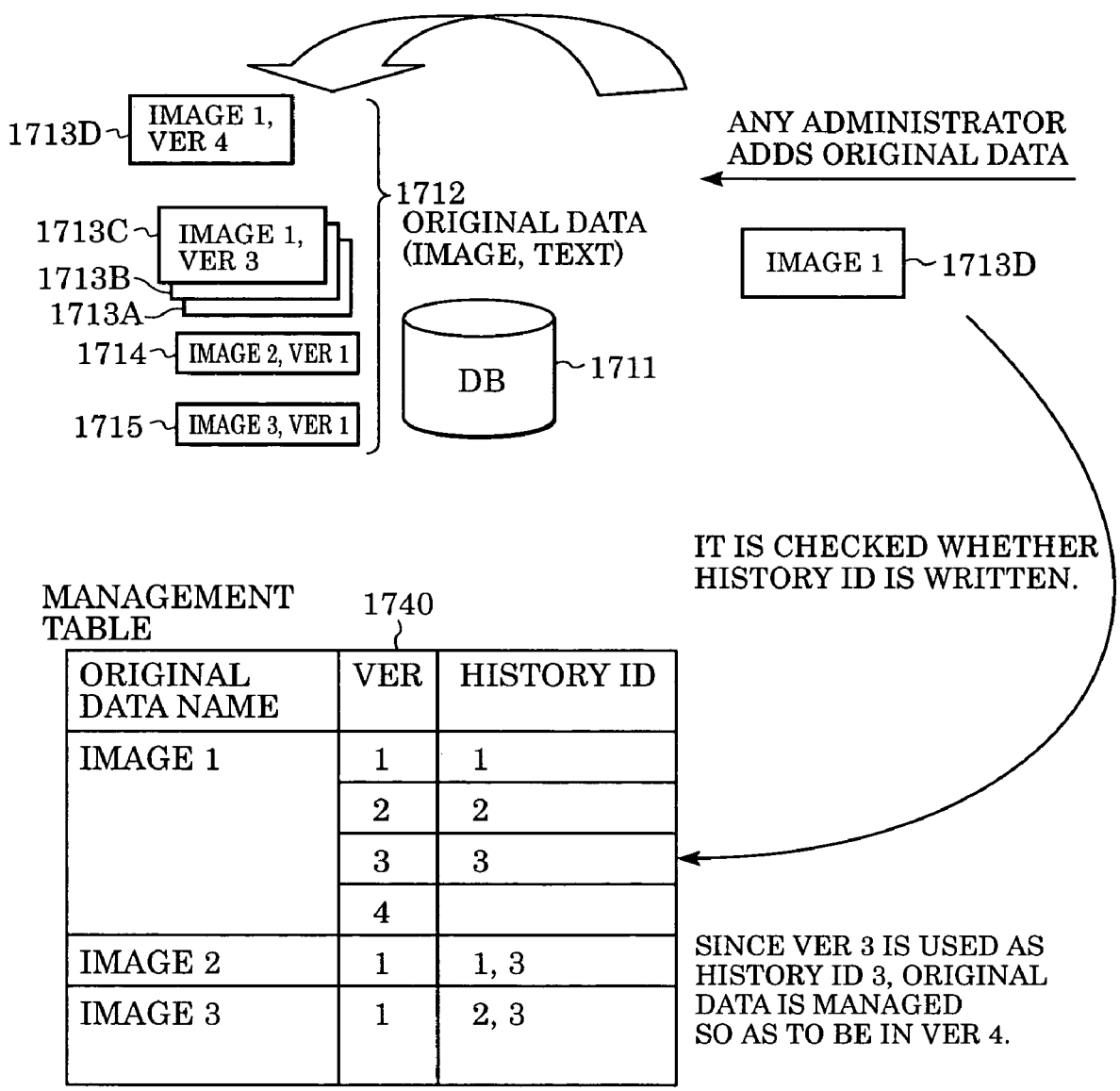
FIG. 18 illustrates a case where original data (variable data) is added in a state of the history table and the management table shown in FIG. 17.

FIG. 18 illustrates adding original data in a state of the history table 1730 and the management table 1740 shown in FIG. 17. An exemplary case where any administrator adds original data 1713D including updated Image 1 will be described. First, it is determined whether Image 1 of the original data 1713D is already registered in the original data name column of the management table 1740. If already registered, it is determined whether its history ID is registered in the corresponding cell of the present latest Version 3. Since Number 3 is registered in the cell of latest Version 3 so as to serve as a history ID, the original data 1713D is registered in the management table 1740 and the database 1711 in a form of new Version 4 of Image 1. If no number is registered in the cell of the history ID column, corresponding to Version 3, the original data 1713D is overwritten as Image 1 in Version 3. Since no registration in the history ID column means that the original data is not used for producing a catalogue, the original data may be deleted by overwriting.

As described above, when any administrator tries to update the original data, if no history ID exists in the corresponding cell of the history ID column of the management table 1740 of the original data to be updated, the updated data is overwritten. If, however, a history ID exists, the data is managed as the original data in its new version. Version management is automatically performed in accordance with use or nonuse of the original data.

FIG. 19 illustrates reprinting (reusing) of a catalogue in the state of the history table 1730 shown in FIG. 17 and the management table 1740 shown in FIG. 18.

In step (1), for example, a user instructs the catalogue producing system to reprint the catalogue 1720 having its history ID of Number 3. It is known from the management table 1740 that Number 3 of the history ID is used by Image 1 in Version 3, Image 2 in Version 1, and Image 3 in Version 1 of the original data. Of these images, Image 1 in Version 3 is updated to the same in present Version 4.

Next, in step (2), the catalogue producing system asks the user to determine which one of Images 1 in Versions 3 and 4 is used. Image 1 used upon producing the catalogue is the data 1713C in Version 3, and present Image 1 is the data 1713D in latest Version 4.

Subsequently, in step (3), when the user selects Image 1 in Version 3, the catalogue is printed in accordance with the management table 1740 without changing it. When the user selects Image 1 in Version 4, Number 3 of the history ID column is transferred from Version 3 to Version 4. That is, Number 3 corresponding to Version 3 is deleted from the history ID column, Number 3 corresponding to Version 4 is registered in the history ID column, and the table is changed to a management table 1901.

Further, in step (4), when the history ID is transferred to a cell of the history ID column, corresponding to latest Version 4, the history ID corresponding to Version 3 does not exist. In other words, it is known that Version 3 is not used in any catalogues, Image 1 in Version 3 is deleted from the management table 1901 and the table is changed to a management table 1902.

As described above, the catalogue data is regenerated from the management table 1740 when the user reprints the catalogue. If the original data is already updated by any administrator, the user is asked to determine which version of the original data is selected. If a new version of the original data is selected, it is sufficient to merely transfer the corresponding history ID in the history ID column of the management table 1740 to a cell of the same, corresponding to the new version, without changing the history table 1730. If, on this occasion, no ID is present in the corresponding cell of the history ID column of the management table 1901 of the original data, the original data in the corresponding version is automatically deleted.

According to the present embodiment, data management is effectively achieved, and a previously produced catalogue can be reproduced free from troublesome operations, only by designating its history ID. In addition, when the original data is already updated, a user can select which one is used, thereby resulting in the latest catalogue. Also, unused original data is automatically deleted, thereby resulting in effective data management.

First Embodiment

Figure 1:
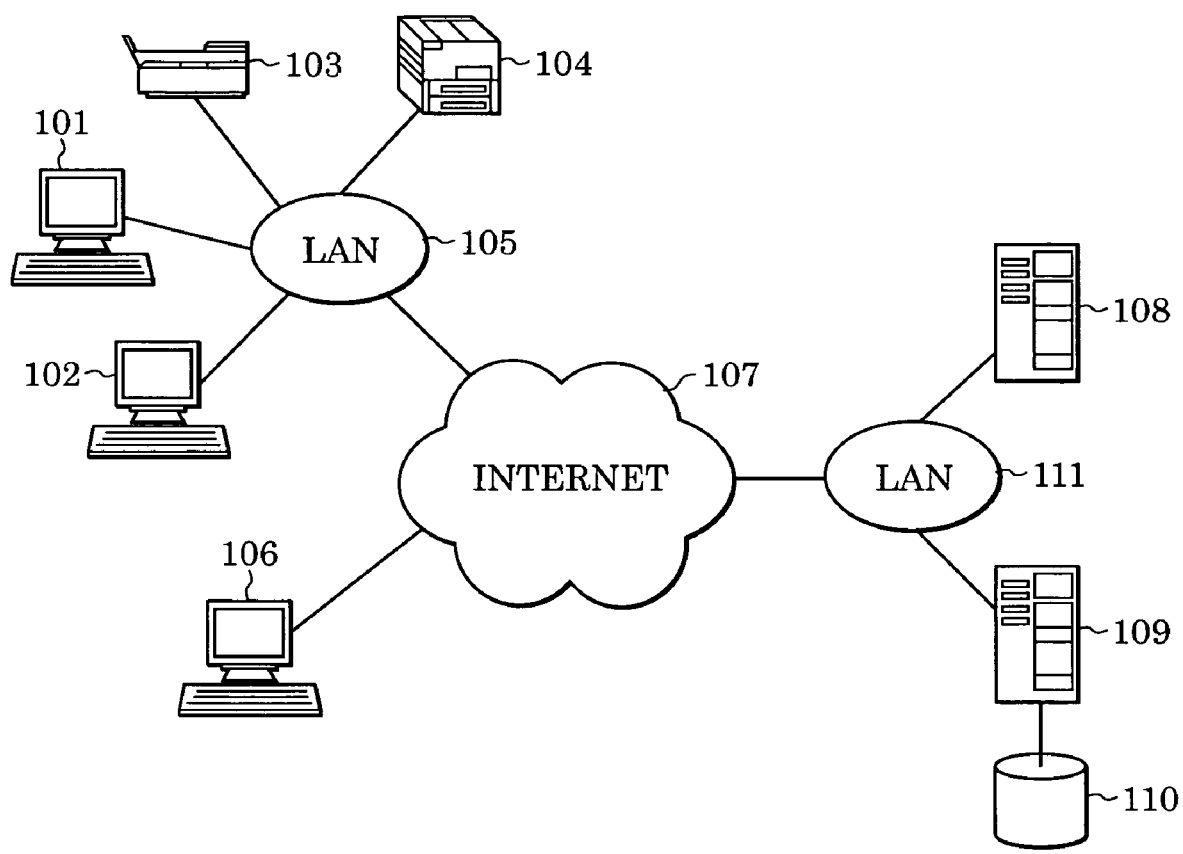
FIG. 1 is a schematic view of an on-demand catalogue-producing system according to one embodiment of the present invention.

FIG. 1 is a schematic view illustrating an on-demand catalogue-producing system according to a first embodiment of the present invention. The system includes client personal computers (PC's) 101 and 102, with which a system administrator registers a new data file or processes maintenance of the system such as modifying user management information, or a user instructs to perform a product search, an output of product information, or the like. The system also includes a scanner 103 reading an image shared on the network of the system, for reading image data and the like of a catalogue in accordance with instructions of the client PC's.

The system also includes a printer 104 shared on the network, for outputting product information, catalogue data, or the like in accordance with instructions from the client PC's 101, 102.

The system also includes local area networks (LAN's) 105 and 111. The appliances 101 to 104 connected with the network 105 exchange data with the other appliances via the LAN 105. Further, the system includes the Internet 107, and a client PC 106 directly connected to Internet, which is used for the same purpose as the client PC's 101 and 102 although its connecting structure is different from that of the latter ones.

In addition, the system includes an HTTP server 108 receiving requests in conformity with an HTTP protocol, inputted by the client PC's via the network, and Web application servers 109. The HTTP server has a plurality of the Web servers registered therein and allocates processes of the requests to the respectively suitable Web application servers, depending on the contents of the requests. The Web application server having received the request executes the corresponding process and returns the processed result to the corresponding client PC. Furthermore, the system includes a database 110 for storing content information including catalogue data and image data, text information including product information, operator and/or group information, and system information including process information of registered data files.

As described above, a combination of the HTTP server 108, the WEB application servers 109, and the database 110 serves as a WEB database system.

Figure 2:
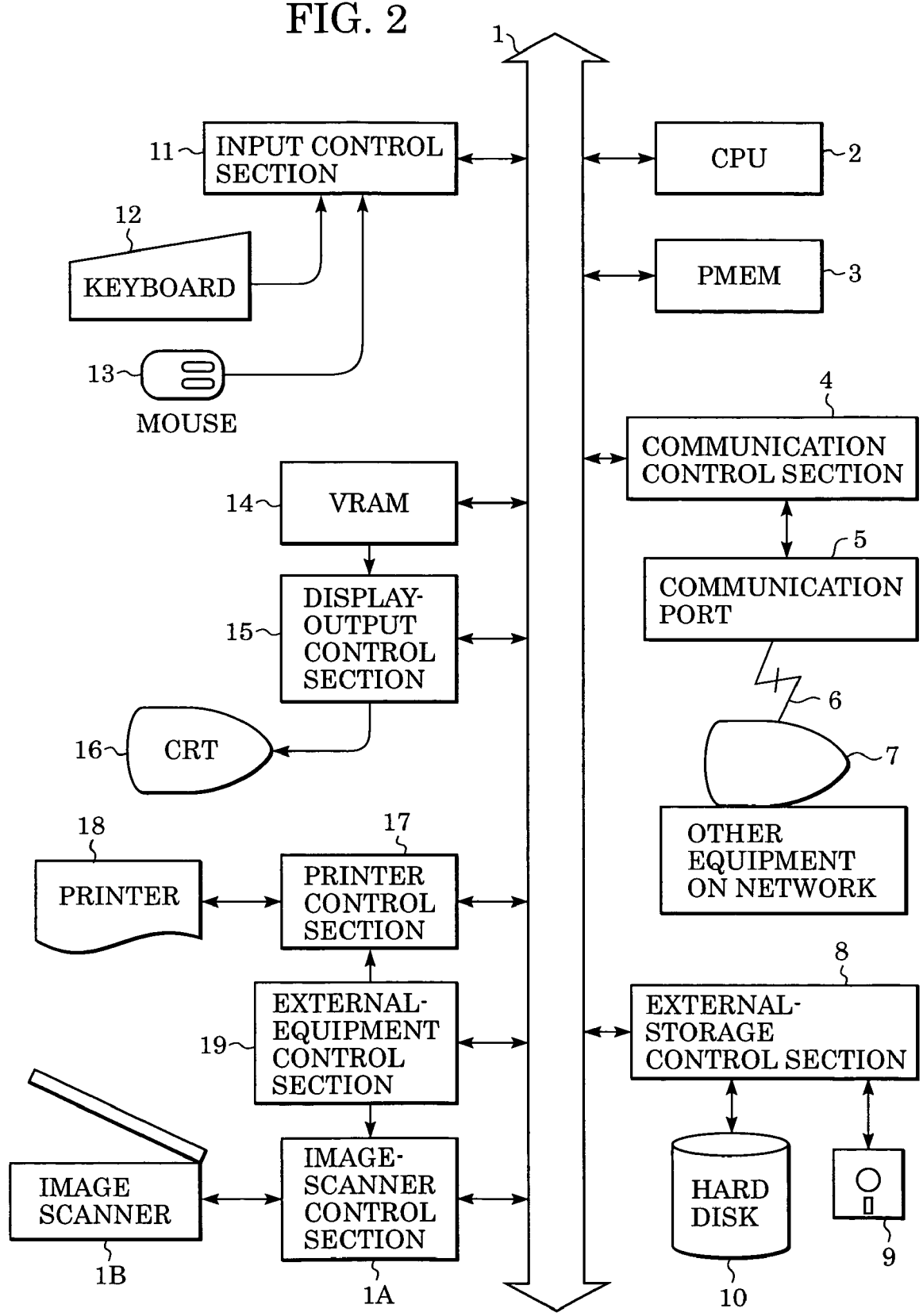
FIG. 2 is a block diagram illustrating the structure of apparatuses according the embodiment of the present invention.

FIG. 2 is a block diagram illustrating the structure of the system including the apparatus 101, 102, 106, 108, and 109 according to the present embodiment. The system includes a system bus 1, and each of configuration blocks, which will be described below, is connected to the system bus 1. The system also includes a central processing unit (CPU) 2 and a program memory (referred to as a PMEM) 3 selecting and reading a program from a hard disk 10 if needed, for performing the present process, and the CPU 2 executes it. Data inputted from a keyboard 12 is stored as code information in the PMEM so as to serve also as a text memory.

In addition, the system includes a communication control section 4 controlling input-output data at a communication port 5. A signal outputted from the communication port 5 is transmitted to a communication port of each of other equipment 7 on the network via a communication link 6. A signal is exchanged between a printer and an image-scanning apparatus shared on the network via the communication control unit 4.

While the network such as a LAN is described in the present embodiment, one skilled in the art will appreciate that the present invention is applicable even when a communication port and a communication link connected to the communication unit are each a general public circuit.

The system further includes an external-storage control section 8, and data-filing disks 9 and 10. For example, the disks 9 and 10 are respectively a flexible disk (referred to as an FD) and a hard disk (referred to as an HD). The database 110 shown in FIG. 1 corresponds to the hard disk 10.

The system furthermore includes an input control section 11 having an input apparatus, including the keyboard 12 and a mouse 13, connected thereto. By operating the keyboard 11, an operator instructs an operation and the like of the system.

The system still further includes a pointing device (referred to as a PD) 13 providing an instruction for processing image information on a CRT 16. A mouse is used as the pointing device 13 in the present embodiment. With this arrangement, by arbitrarily moving a cursor on the CRT 16 in the X and Y directions, other than selecting a command icon on a command icon and instructing processing of the command, the operator instructs an editing subject, a drawing position, and so forth. Also, the system includes a video image memory (called a VRAM) 14, a display-output control section 15, and the CRT 16, data on which is deployed as bitmap data on the VRAM 14. Further, the system includes a printer control section 17 controlling an output of data outputted to a printer 18 connected thereto.

Also, the system includes an image-scanner control section 1A controlling an image scanner 1B connected thereto. The scanner 103 shown in FIG. 1 corresponds to the image scanner 1B.

It is presumed that, even when the image scanner and the image-scanning apparatus are physically different from each other, or the image-scanning apparatus is a single component including the image scanner, these two components perform the same function as each other.

While a program is stored in a read only memory (ROM) in the present embodiment, it may also be stored in a storage medium, such as a hard disk (HD) or a flexible disk (FD), directly connected to the apparatus. In addition, it may be stored in another apparatus connected to the network. The program in the present embodiment can be supplied to the system and the apparatuses via a storage medium such as an FD or an HD.

The present embodiment is achieved by executing the program with a computer. Also, the present invention is applicable to a gadget as another embodiment for supplying the program to the computer, for example, a recording medium such as a computer-readable CD-ROM storing such a program, or a communication medium such as the Internet transmitting such a program. In addition, the present invention is applicable to a computer program product as another embodiment thereof, such as a computer-readable recording-medium recording the foregoing program. The foregoing program, recording medium, communication medium, and computer program product fall in the scope of the present embodiment. As the example recording media, a flexible disk, a hard disk, an optical disk, a magneto-optical disk, a CD-ROM, a magnetic tape, a nonvolatile memory card, a ROM are included.

Figure 3:
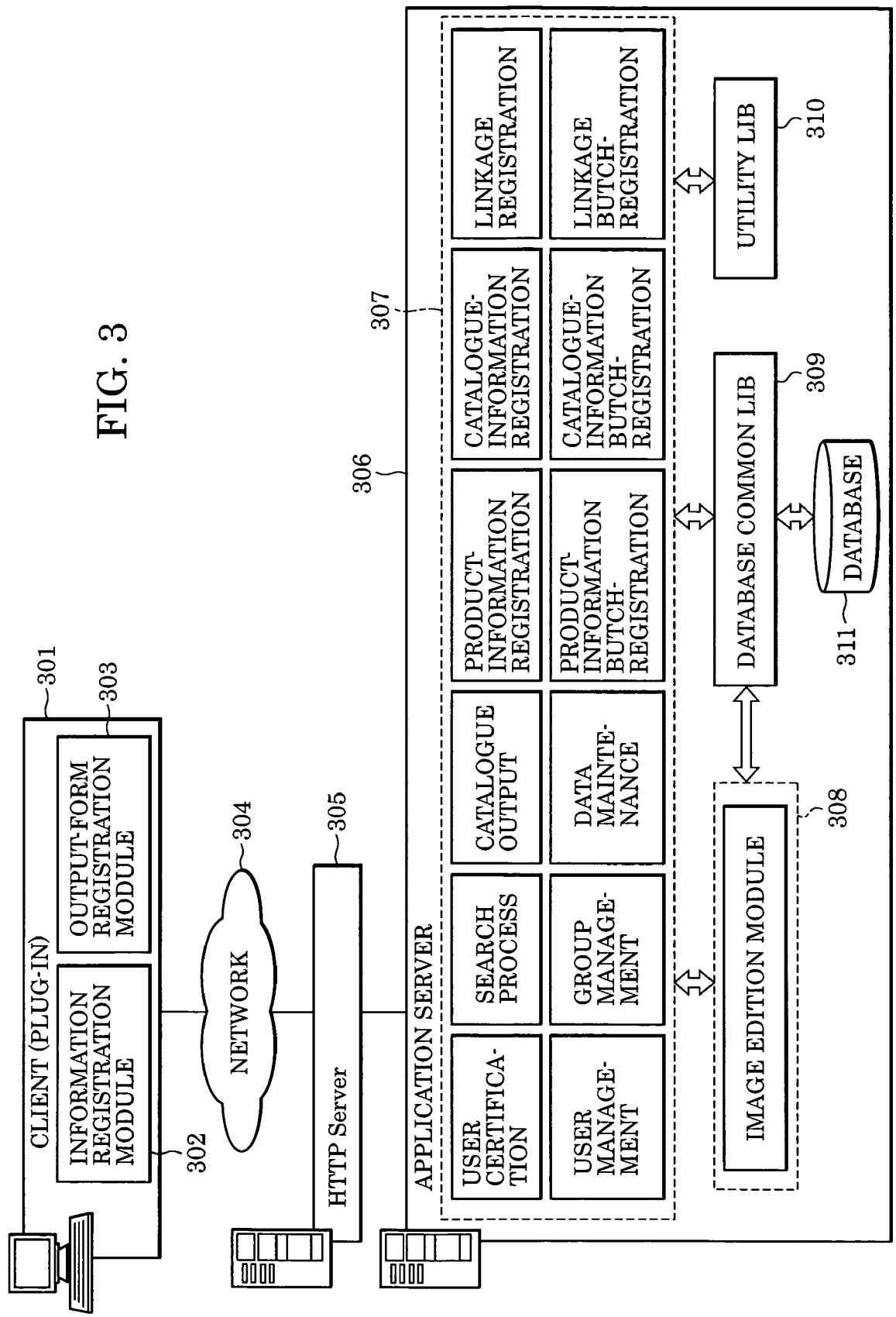
FIG. 3 is a block diagram illustrating the module structure of the system according the embodiment of the present invention.

FIG. 3 is a block diagram of the module structure of the on-demand catalogue-producing system according to the present embodiment. The system includes a client PC 301 having an information registration module 302 and an output-form registration module 303 stored therein, respectively for registering data files for catalogue information, image data, and so forth to a server, and for registering a form for outputting product data. Since these modules are automatically distributed by a server PC if needed, for example, in Plug-in form of the WEB browser, the client PC is not required to perform an operation of, for example, installing these modules. The system also includes a network 304 for exchanging data and an HTTP server 305.

In addition, the system includes a Web application server 306 having a module 307 stored therein, for processing a request of the client PC 301, received from the HTTP server 305. The server 306 corresponds to functions such as a user certification, a search process, a batch registration of a variety of data, an output of product information, and data maintenance. These modules are loaded in the memory and processed according to a request from the client PC.

Other than these modules, the system includes an image edition module 308 for editing an image, a library 309 for exchanging data with a database 311, and a variety of utility libraries 310.

FIG. 4 illustrates a method for saving image data and text data in the database, serving as the basis for generating catalogue data.

With respect to the reference numbers in the figure, reference number 401 denotes a file, which contains a plurality of image data in Version 1 (402), Version 2 (403), and Version 3 (404) for management under a single file name of Image 1. Likewise, reference numbers 405 and 407 denote other files, which respectively contain image data in Version 1 (406) for management under a file name of Image 2 and text data in Version 1 (408) for management under a file name of Text 1.

FIG. 5 illustrates a management table of database used for managing original data serving as the basis for producing an on-demand catalogue. In the management table, attributes 501 and 502 for respectively indicating a file name of each original data and version-control information of the original data, and a number (a history ID) 503 uniquely put on a catalogue as its history and indicating an attribute to be added to a record of original data used when the catalogue is produced by a user are shown. Also, three pieces of original data 504, 505, and 506, respectively, corresponding to the files 401, 405, and 407, and versions of the original data 507, 508, 509, 510, and 511, respectively, corresponding to the versions 402, 403, 404, 406, and 408 are shown.

FIG. 6 illustrates form data saved in the database. With respect to the reference numbers in the figure, reference numbers 601, 602, and 603 denote exemplary form data displayed through interpretation of the image edition module 308. Reference numbers 604 to 610 denote portions in which a user can merge data. The form data can be generated or changed by the user.

Figure 7:
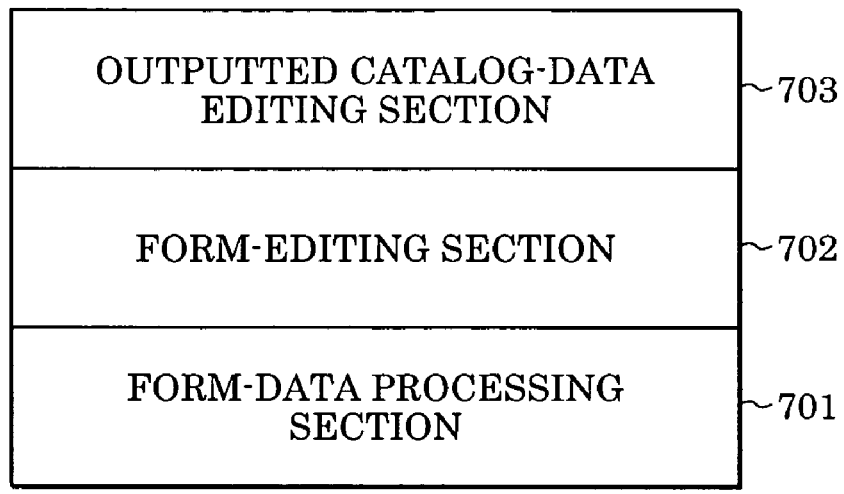
FIG. 7 illustrates an image edition module according the embodiment of the present invention.

FIG. 7 illustrates the image edition module 308 according to the present embodiment. The image-edition module 308 includes a processing section 701 for processing form data written in a structure-defining language for defining the form data for generating catalogue data.

The image-edition module 308 also includes a processing section 702 for displaying the form data processed by the form-data processing section 701 in accordance with the structure and for editing the displayed form a data.

The image-edition module 308 further includes another processing section 703 for generating output data for combining the form data and the corresponding original data with each other, editing the combined data, and outputting it as a catalogue.

Figure 8:
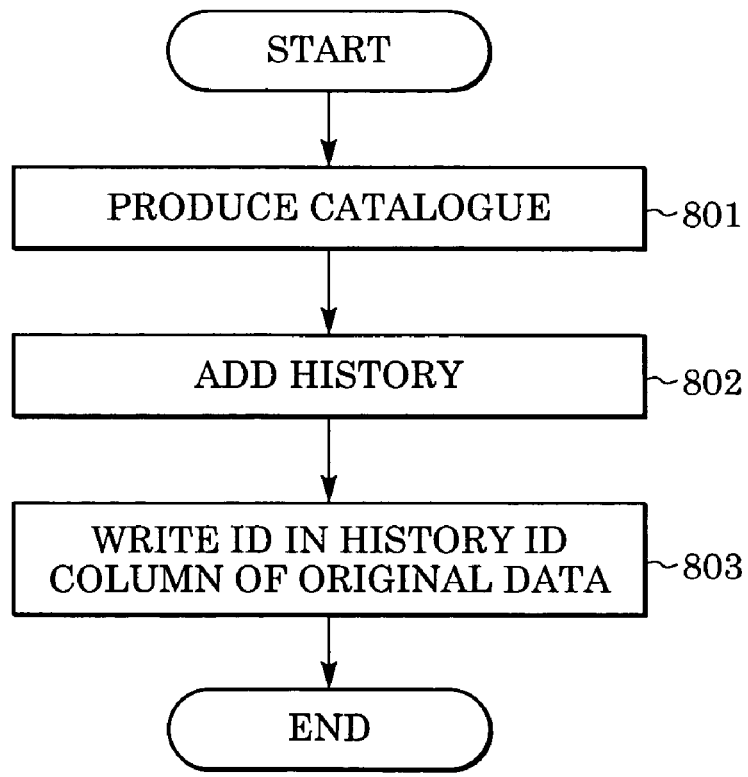
FIG. 8 is a flowchart of an operation of the system when an on-demand catalogue is newly produced by a user.

FIG. 8 is a flowchart of an operation of the on-demand catalogue-producing system when a user newly produces an on-demand catalogue. In step 801, the user selects a form and original data for producing an on-demand catalogue and then produces it. In step 802, when the user produces the on-demand catalogue, its history is added to its history table. In step 803, its history ID is written in the history ID column of the corresponding original-data management table.

FIG. 10 illustrates a history table to which a user adds a history of an on-demand catalogue produced by the user. The history table is stored in the database. In the history table, an attribute 1001 indicating an ID uniquely allotted to every history of the catalogue produced by the user, and other attributes 1002, 1003, and 1004 indicating, respectively, a user name producing the catalogue, a form name used for producing the catalogue, and an original data name of original data used for producing the catalogue are provided.

FIG. 11 illustrates an original-data management table for linking original data used by a user, for producing an on-demand catalogue. When the original data is used for producing the on-demand catalogue, the table is updated.

FIG. 9 illustrates an example on-demand catalogue produced by a user. The procedure of producing the catalogue shown in FIG. 9 will be described, referring to the flowchart shown in FIG. 8. In step 801, the user selects a form and original data for producing the on-demand catalogue and then produces it. In the case of the catalogue shown in FIG. 9, Form A (901), Image 1 in Version 3 (404), Image 2 in Version 1 (406), and Text 1 in Version 1 (408) are respectively selected as a form, an image 902 to be merged in Form A, an image 903 to be merged in Form A, and a character row 904 by way of example. In step 802, when the user produces the on-demand catalogue, its history is added to the history table shown in FIG. 10. As shown in the figure, a history ID 1005 is provided with Number 3, a user name is provided with User A because of production by User A (1006), a form name is provided with Form A, and original data names 1008 are provided with Image 1, Image 2, and Text 1 by way of example. In step 803, history IDs are written in the history ID column of the original-data management table as shown in FIG. 11. Reference numbers 1101, 1102, and 1103 in the table indicate, by way of example, that Image 1 in Version 3, Image 2 in Version 1, and Text 1 in Version 1 are respectively used at the time of History ID 3.

Figure 12:
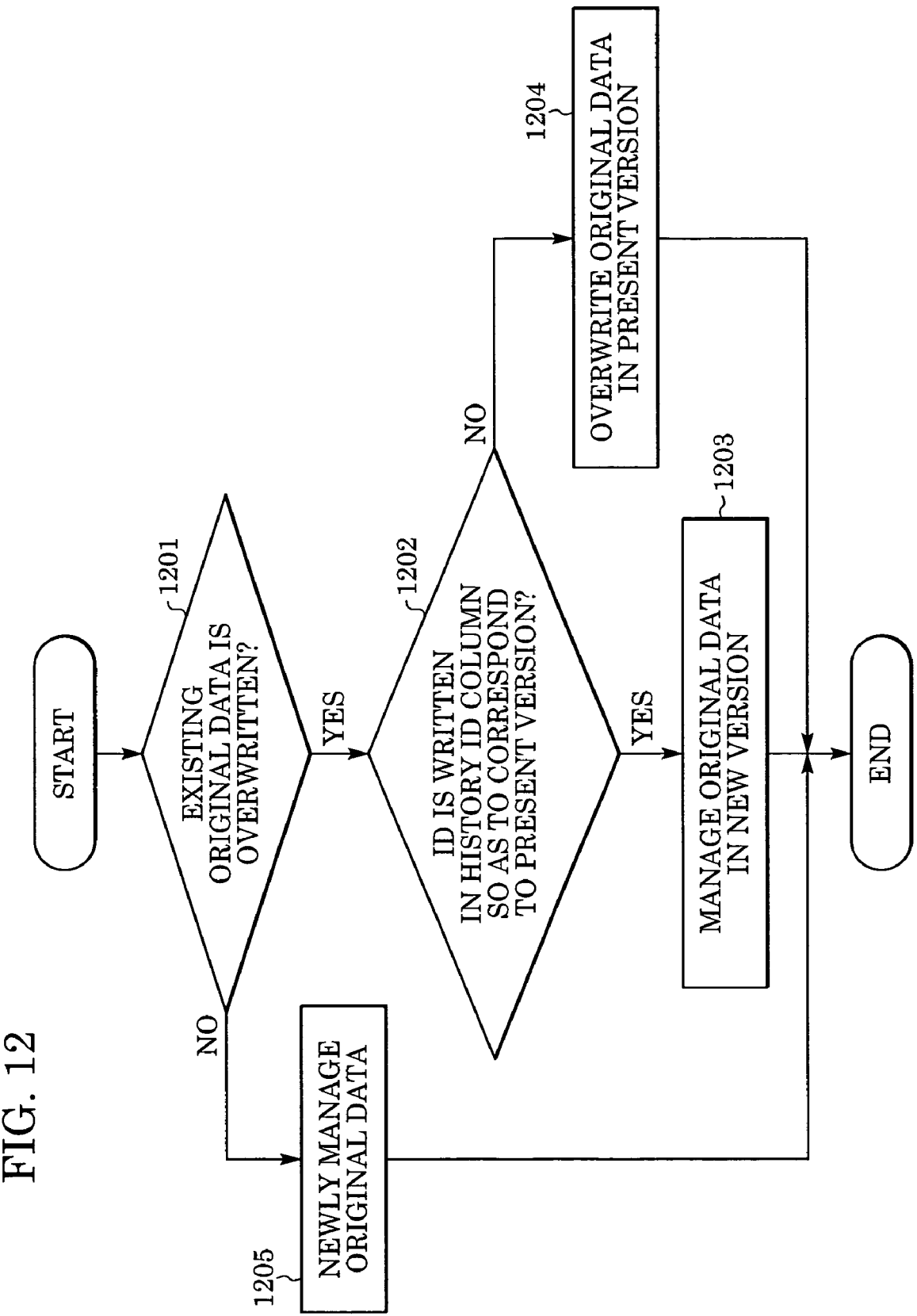
FIG. 12 illustrates a flowchart of an operation of the system when the variable data is added to the database.

Another embodiment will be further described. A flow of adding original data to the database in the foregoing embodiment, performed by any administrator or a user, will be described with reference to FIG. 12. In the case where original data is added in a situation in which other original data is already saved in the database as shown in FIG. 4, in step 1201, when the original data name of the original data to be added is already present in the database, it is determined whether the existing original data is overwritten. If YES, the process moves to step 1202, and if NO, the process moves to step 1205. It is determined in step 1202 whether ID is written in the cell of the history ID column, corresponding to the present version. If YES, the process moves to step 1203, and if NO, the process moves to step 1204. In step 1203, since the affirmative determination indicates that the user is using the original data, the original data is managed as being in its new version, and its record is added to the management table.

Figure 13:
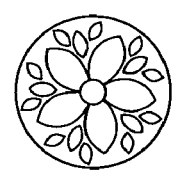
FIG. 13 illustrates a saving state of the database and the management table.

FIG. 13 illustrates a saved state of the database and the management table at that time. Reference numbers 1301 and 1302 in the figure respectively show that the original data added to the data base is saved under the file name of Image 1 in Version 4 and that its record is added to the management table under the original data name of Image 1 in Version 4.

While the original data name of the original data to be added is already present in the database in step 1201, when no ID is written in the cell of the history ID column, corresponding to the present version in step 1202, in other words, when the original data in the present version is not used, the process moves to step 1204. In step 1204, the original data is overwritten on that in its present version and saved. In step 1205, when the original data is added to the corresponding database under a new original data name, the original data is newly saved, and its record is added to the corresponding management table together with the new original data.

Figure 14:
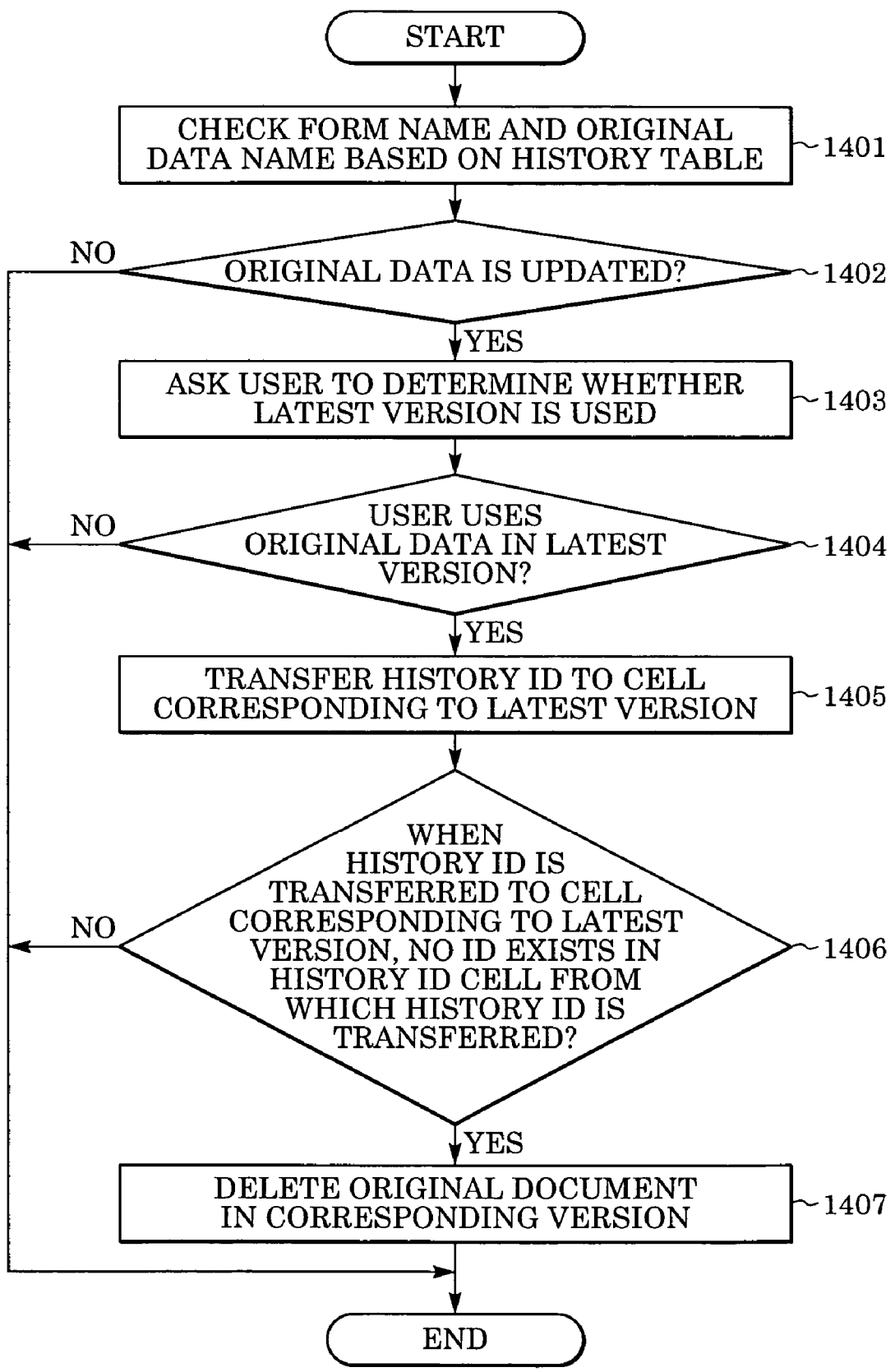
FIG. 14 illustrates a flowchart of the operation of the system when reprint is performed by the user.

Another embodiment will be further described. Upon reprinting a catalogue in the first embodiment, a user can only reprint a previously-produced on-demand catalogue by designating its history ID. FIG. 14 illustrates a flowchart of an operation of the on-demand catalogue-producing system when a user reprints a catalogue. When the user designates the history ID for reprinting the catalogue, in step 1401, the corresponding form name and data name are searched on the basis of the history table. In step 1402, by consulting the corresponding original-data management table on the basis of the original data name, it is checked whether the original data is updated as shown by the history ID 1302. If YES, the process moves to step 1403, and if NO, the process ends. In step 1403, the user is asked to determine whether or not to use the original data in the latest version. In step 1404, it is checked whether the user uses the original data in the latest version. If YES, the process moves to step 1405, and if NO, the process ends. In step 1405, the history ID in the original-data management table is transferred so as to correspond to the latest version, as will be described in FIG. 15. In step 1406, when the history ID is transferred so as to correspond to the latest version, it is checked whether no ID exists in the cell of the history ID column, from which the history ID is already transferred. If YES, the process moves to step 1407, and if NO, the process ends. In step 1407, since it is known that nobody is using the corresponding version, the corresponding data is deleted. FIG. 16 illustrates the original-data management table on that occasion.

Another embodiment will be further described. Upon re-editing a catalogue, a user can achieve the re-edition by restoring it from the corresponding history data.

As described above, according to the foregoing embodiments, the history table stores the corresponding relationship of each configuration data (each history ID of a catalogue) stored therein, between the configuration data and the original data used in the configuration data, and the management table has the corresponding relationship of each original data stored therein, between the original data and the configuration data formed by using the original data. In order to generate the configuration data, the foregoing corresponding relationships are registered in the management table and the history table. With this arrangement, configuration data previously generated on the basis of the history table can be reused for printing or editing a catalogue, for example.

Information about what and how form data (a document form) and original data (Image, Text) are used by a user for producing a catalogue is managed in a form of history. When a user hopes to reuse it, the catalogue is produced again on the basis of the history.

If the original data is updated by any administrator on that occasion, its previously produced catalogue cannot be produced, whereby the management table linking a history ID (a number uniquely put on a history of a catalogue produced by a user) and the corresponding original data is prepared.

With the above arrangement, the following is achieved:

(1) When any administrator updates original data, if its history ID is not present in the history ID column of the management table of the original data to be updated, the original data is overwritten. If, however, the history ID is present, the original data is managed as being in its new version. That is, the version of original data is automatically managed depending on whether or not the original data is used.

(2) When a user reprints a catalogue, its catalog data is regenerated from the history table. If the corresponding original data is already updated by any administrator, the user is asked to determine which version to use.

(3) If the new version of the original data is selected in the foregoing (2), it is sufficient to merely transfer the corresponding history ID in the history ID column of the management table to a cell of the same, corresponding to the new version, without changing the history table. If, on this occasion, no ID is present in the corresponding cell of the history ID column of the management table of the original data, the original data in that version is automatically deleted.

As described above, according to the present embodiment, data management is effectively achieved, and a previously produced catalogue is reproduced free from troublesome operations, only by designating its history ID. In addition, when the original data is already updated, a user can select which one to use, thereby producing the latest catalogue. Also, unused original data is automatically deleted, thereby resulting in an effective data management. Further, preparing the history table and the management table leads to effective data management. Hence, a previously produced configuration data can be outputted again only by designating the configuration data free from troublesome operations.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all modifications and equivalent structures and functions.

This application claims priority from Japanese Application No. 2004-241423 filed Aug. 20, 2004, which is hereby incorporated by reference herein.

What is claimed is:

1. A data-processing apparatus including memory storing a program for processing form data including predetermined layout information and image-forming data formed by merging variable data in the form data, comprising:

a processor for executing the program;

a storage unit configured to store, when the image-forming data for printing is formed, information of a user instructing to form the image-forming data, form identification information and variable data identification information in a corresponding manner and a plurality of version information of the variable data by correlating with the variable data identification information, wherein the stored form identification information identifies the form data used for forming the image-forming data and the stored variable data identification information identifies the variable data used for forming the image-forming data;

a checking unit configured to check, according to the user's instruction of reusing image-forming data previously formed, whether or not any one of the stored plurality of version information of variable data, which is newer than version information of the variable data used for previously forming the image-forming data instructed to be reused by the user, is stored in the storage unit;

a display unit displaying, according to the user's instruction of reusing image-forming data previously instructed to be formed by the user, a screen for the user to designate which among the version information of variable data used for previously forming the image-forming data and the newer version information of variable data is to be used, in response to the check result verifying that the stored plurality of version information is newer than version information of variable data;

a reforming unit configured to reform the image-forming data by using the form data, base on the form identification information stored in the storage unit and the variable data, the variable data designated by the user via the screen displayed by the displaying unit; and a management unit configured to delete, in response to the designation of using the newer version information of variable data via the screen displayed by the display unit, the version information of variable data used for previously forming the image-forming, which is no longer in use, from the storage unit.

2. The data-processing apparatus according to claim 1, further comprising a printing unit configured to print the image-forming data reformed by the reforming unit.

3. The data-processing apparatus according to claim 1, further comprising an editing unit configured to edit the image-forming data reformed by the reforming unit.

4. The data-processing apparatus according to claim 1, wherein the variable data includes image data and text data.

5. A data-processing method for processing form data including predetermined layout information and image-forming data formed by merging variable data in the form data, comprising the steps of:

storing, when the image-forming data is formed, information of a user instructing to form the image-forming data, form identification information for identifying the form data used for forming the image-forming data, variable data identification information for indentifying the variable data used for forming the image-forming data in a corresponding manner, and a plurality of version information of the variable data by correlating with the variable data identification information;

checking, according to the user's instruction of reusing image-forming data previously formed, whether or not any one of the stored plurality of version information of variable data, which is newer than version information of the variable data used for previously forming the image-forming data instructed to be reused by the user, is stored in the storing step;

displaying, according to the user's instruction of reusing image-forming data previously instructed to be formed by the user, a screen for the user to designate which among the version information of variable data used for previously forming the image-forming data and the newer version information of variable data is to be used, in response to the check result verifying that the stored plurality of version information in newer than version information of variable data;

reforming image-forming data by using the form data based on the form identification information stored in the storing step and the variable data, which the variable data designated by a user via the screen displayed in the displaying step; and deleting, in response to the designation of using a newer version information of variable data via the screen displayed in the displaying step, the version information of variable data used for previously forming the image-forming, which is no longer in use, that was stored in the storing step.

6. The data-processing method according to claim 5, further comprising the step of printing the image-forming data reformed in the reforming step.

7. The data-processing method according to claim 5, further comprising the step of editing the image-forming data reformed by the reforming unit.

8. The data-processing method according to claim 5, wherein the variable data includes image data and text data.

9. A recording medium storing a program executable by a computer to perform the data-processing method according to claim 5.

10. The data-processing method according to claim 5, wherein the storing step includes storing a plurality of version information of the variable data by correlating with the variable data identification information, and wherein, when the image-forming data is formed, the storing step includes storing form identification information for identifying the form data used for forming the image-forming data, variable data identification information for identifying the variable data used for forming the image-forming data, and the plurality of version information of the variable data in a corresponding manner.

11. The data-processing method according to claim 10, further comprising deleting version information stored in the storing step without a corresponding manner with the form identification information.

12. The data-processing method according to claim 10, further comprising displaying, when the plurality of version information is stored in the storing step by correlating with the variable data identification information for reforming the image-forming data in reforming the image-forming data in the reforming step, a screen on which a user selects version information for reforming the image-forming data by using variable data based on the version information.

13. The data-processing apparatus according to claim 12, wherein, when newer version information is stored in the storing step by correlating with the variable data identification information than the version information which is stored in a corresponding manner with the form identification information and the variable data identification information used for reforming the image-forming data, the displaying step includes displaying a screen on which a user selects whether or not to reform the image-forming data by using variable data based on the new version information.

* * * * *